Nov. 10, 1970 P. F. EVANS ET AL 3,540,008

SOLID STATE STORAGE DEVICES HAVING NON-CORONA EXTINCTION CAPABILITY

Filed Dec. 20, 1967

INVENTORS
PAUL F. EVANS
HAROLD D. LEES

BY Ronald Zibelli

ATTORNEYS

United States Patent Office 3,540,008
Patented Nov. 10, 1970

3,540,008

SOLID STATE STORAGE DEVICES HAVING NON-CORONA EXTINCTION CAPABILITY

Paul F. Evans, Pittsford, and Harold D. Lees, Rochester, N.Y., assignors to Xerox Corporation, Rochester, N.Y., a corporation of New York Filed Dec. 20, 1967, Ser. No. 692,150
Int. Cl. G11c *11/42*
U.S. Cl. 340—173 18 Claims

ABSTRACT OF THE DISCLOSURE

Several methods of non-corona extinction of solid state storage devices and the associated structure for carrying out said methods are disclosed herein. The primary method involves the application of a potential to a transparent dielectric layer having specified electrical properties which overlays the field-effect semiconductor layer in a solid state storage device of the class to which the present invention relates to bring about the extinction of electroluminescent phosphors of the image storage device. An alternative approach utilizes a stream of moist air directed toward the control layer of a solid state display device to darken it.

BACKGROUND OF THE INVENTION

In general, the present invention relates to solid state storage devices and more specifically to the production of non-corona extinction of such devices.

The general type of device with which the present invention is concerned is fully disclosed in U.S. Ser. No. 582,856, filed Sept. 29, 1966, by Kazan et al. and assigned to the common assignee of the present application. An improved device of this type along with the method of fabricating the same is disclosed in the applicants co-pending application Ser. No. 692,047, filed Dec. 20, 1967, now abandoned, and assigned to the common assignee of the present application.

The prior art in this area has in general suffered from the necessity of erasing or extinguishing the luminescence of the electroluminescent phosphors of such devices by the application of a control field to their field-effect semiconductor material, usually zinc oxide. While other approaches have been suggested as theoretically possible, such as a point by point deposition of charge, none of the alternatives to the use of a scanning corona wire have had those characteristics necessary to gain practical acceptance. It is necessary in the prior art to raise the impedance of the control or field-effect layer. To do so in the case of a zinc oxide field-effect layer has in general required the deposition of a negative charge on that layer. The deposition of a uniform negative charge over a large area is quite difficult to produce due to periodic nodal points of high field which inherently exist along the length of a negative corona wire. In addition high voltages, on the order of 6000 volts, are commonly required for corona charging. Arcing and corona wire integrity problems pose a constant threat to reliable storage panel operation. This fact is particularly important in view of the fact that reliability has long been stressed a one of the strong points of solid state storage devices. The present invention solves the above problems by providing for the non-corona extinction of solid state storage devices.

Accordingly, it is an object of this invention to provide a new, unobvious, and highly effective non-corona extinction device and method which overcomes the deficiencies of the prior art as described above.

It is a further object of this invention to provide a device capable of non-corona extinction.

Another object of this invention is to provide methods of achieving non-corona extinction of a solid state storage device.

Other objects of the present invention and a fuller understanding of the invention may be had by referring to the following description and claims taken in conjunction with the accompanying drawings.

SUMMARY OF THE INVENTION

The present invention overcomes the deficiencies of the prior art and achieves its objectives by providing for the application of a potential to a transparent dielectric layer having specific electrical properties, as defined below, which overlays the field-effect semiconductor layer in a typical solid state storage device to bring about the extinction of the electroluminescent phosphors of such an image storage device. In the alternative a stream of moist air may be directed against the field-effect layer of a solid state storage device of that type to the same effect.

BRIEF DESCRIPTION OF THE DRAWINGS

In order to facilitate the understanding of this invention, reference will now be made to the appended drawings of preferred embodiments of the present invention. The drawings should not be construed as limiting the invention but are exemplary only. In the drawings.

DESCRIPTION OF THE PREFERRED EMBODIMENTS

Figure 1:
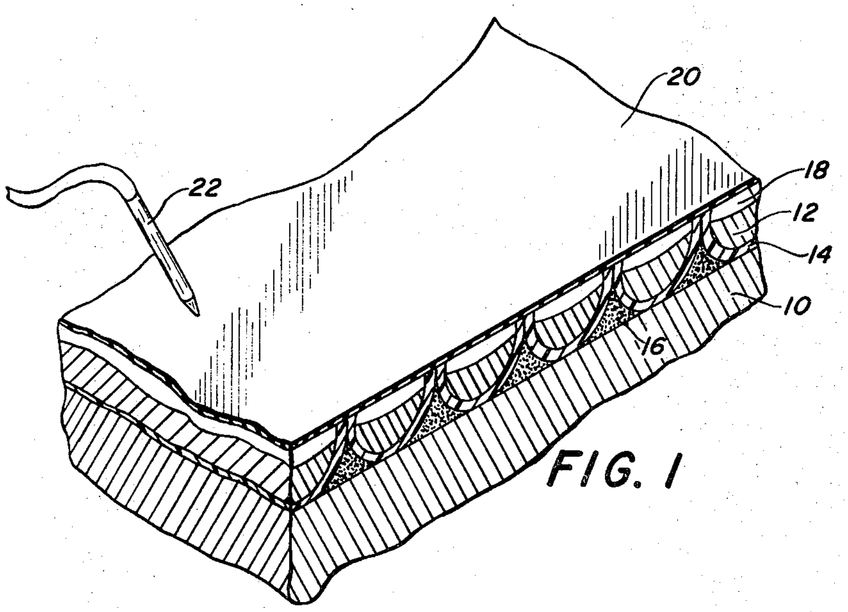
FIG. 1 is a perspective representation of one of the methods of the present invention applied to a typical solid state storage panel.

A typical solid state storage panel of the type which the present invention relates to is shown in FIG. 1. A full description of a panel of this type may be had by reference to the applicant's co-pending application Ser. No. 692,049 referred to above. However, in order to provide a full and complete understanding of the present invention the following remarks with regard to the panel shown in FIG. 1 will be made. The panel of FIG. 1 comprises a plurality of electrically conductive wire elements 12 each of which is coated with an insulating varnish layer 14. These wires are bound to a substrate 10 by an adhesive 16. Each of the wires has been abraded to expose the conductive material and a portion of that conductive material 12 has been etched away to form a surface recessed trough between the insulating varnish overcoating 14 which is unaffected by the etching process. The surface recessed trough is filled with an electroluminescent phosphor material 18. The electroluminescent phosphor material 18 and the barrier insulating material 14 are overcoated with a layer of field-effect or charge-controlled semiconductor 20 such as zinc oxide.

In operation, such solid state storage devices have an alternating current potential applied across alternate adjacent wires 12. The normal current flow produced by such potential is from one wire 12 through its associated electroluminescent phosphor 18 into the field effect semiconductor layer 20, through the electroluminescent phosphor 18 associated with the adjacent wire 12 and into the adjacent wire 12. In the more sophisticated devices of the type disclosed in aplpicant's co-pending application refered to above and shown in FIG. 1 herein, no current current can flow between adjacent electrode wires 12 withoct passing through the field-effect control layer 20 because of the insulating barrier layer 14 between the electroluminescent phosphors 18, thus contrast is increased. However, in devices not utilizing the insulating barrier 14, the operation is substantially as decribed herein because of the path of the strongest electric field lines. In either case, the luminescence of the storage device may be wholy or partialy extinguished by the deposition of charge on the field effect or charge control layer 20 since the charge produces a field which reduces the conductive cross-section of the field-effect layer 20, thereby raising the effective impendance and reducing current through the electroluminescent phosphor 18. In this manner the light output of the phosphor is controlled by the charge on the control layer 20. The charge pattern may be placed on the control layer 20 by contact electrographic styli or by means of an ion gun such as disclosed in U.S. application Ser. No. 602,787 filed Dec. 19, 1966 and its contiuation-in-part U.S. Ser. No 687,855 filed on Dec 4, 1967 and assigned to the common assignee of the present application. In addition, a common mode of operation for such panels is to uniformly charge the control layer surface 20 and then utilize the photoconductive properties of a control layer material such as zinc oxide to selectively neutralize charge on the surface of the control layer by classical photoconductive mechanisms well known to those in these arts. Other methods of charge deposition and/or neutralization may also be utilized.

As has been noted above, one of the most common modes of operation, and perhaps the most important mode of operation from a practical standpoint, has been the use of relative motion between a corona wire and the solid state storage device to bring about extinction of the phospbhor luminescence of that device. Such an approach has been utilized widely with all charge controlled solid state storage devices and is not limited to the specific device described above by way of example and shown in FIG. 1. Also, as has been noted above, it is a prime objective of the present invention to find workable alternatives to the corona extinction of a solid state storage device which overcome the many drawbacks of corona extinction.

One such method of non-corona extinction which is of interest is indicated in FIG. 1. Impressing an alternating current excitation field through wire electrodes 12 produces an overall glow of the storage device shown. Directing a flow of moist air over the surface of the control layer 20 by a suitable pneumatic means 22 produces an initial general brightening followed rapidly by a darkening of the areas on which the air impinged. The darkened areas remain for a substantial period of time, thus the directing of a flow of moist air through an elongated pneumatic means 22 over the entire solid state control layer 20 provides a means of erasing it for display purposes.

By directing a narow stream of moist air onto the storage panel by means 22 one may form characters and the like appearing as a black image on the illuminated background.

It has also been discovered that an erasure of the darkened areas (or re-illumination) may be accomplished by directing a light beam at them, that is, the original illuminated condition is restored after erasing as described above by a source of external radiation directed to the control layer 20. Such a technique is useful for applications of such solid state storage panels as "electronic blackboards" and the like where the solid state panel may be erased by a flow of moist air across it to darken the entire area and then alight pen may be utilized to recrd a message thereon. A hard copy output is also obtainable from the above described displays.

Figure 2:
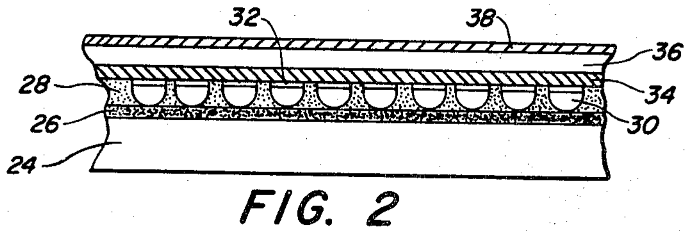
FIG. 2 is a cross-sectional representation of a solid state storage panel with a non-corona extinction capability.

A more important alternative approach to non-corona extinction of storage panels and the preferred embodiment of the present invention is shown in FIG. 2. The basic field-effect solid state storage panel of this embodiment is essentially that shown in FIG. 1. A substrate layer 24 which may be opaque or transparent is coated with an adhensive layer 26 to bind the wound wire configuration to the substrate. Additional epoxy adhesive 28 may be drawn around the wires 30 by capillary action to insure a good bond between wires 30 and the adhesive layer 26 and substrate 24. Each of the wires 30 is coated with an insulating varnish (not shown in FIG. 2 for simplicity) which operates in the manner described in connection with FIG. 1. On top of each wire 30 and bounded laterally by the insulating barrier layer of varnish is a layer of electroluminescent phosphor 32 such as zinc sulfide or any of the other suitable electroluminescent phosphors including mixtures thereof. Over the electroluminescent phosphor and barrier layers is a coating of a field-effect semiconductor 34 such as zinc oxide or a zinc oxide: zinc admixture.

The substrate 24 may be aluminum or similar opaque material or alternatively may be a transparent material such as glass or well known plastic materials of suitable strength and rigidity.

The wires 30 may be composed of any good electrically conductive material such as copper, silver, platinum, brass, and steel alloys. Any good insulating material capable of withstanding the etching agents used to form the surface recession for the electroluminescent phosphors 32 on the wires 30 may be utilized in addition to insulative varnish.

In addition to the use of zinc sulfide as an electroluminescent phosphor a mixture of copper chloride and magnesium activated zinc sulfide in an epoxy binder may be utilized. Further, any number of the well known electroluminescent phosphors may be employed including the numerous mixtures of such phosphors utilized to tailor response and spectral output.

In addition to zinc oxide other typical field-effect semiconductors include cadmium sulfide, cadmium oxide, cadmium selenide, silicon, germanium, zinc sulfide, activated zinc sulfide, zinc oxide, lead oxide, and the like.

In order to provide the above described solid state storage panel with a non-corona extinction capability, a transparent dielectric film 36 is bonded to the field-effect semiconductor layer 34 by an acrylic-epoxy adhesive, rubber cement, or the like. Over the transparent dielectric layer 36 is bonded a transparent conductor 38 utilizing similar adhesive materials.

Surprisingly, it has been discovered that the application of a potential to the transparent conductive layer 38 at a point results in extinguishing the entire solid state panel face. This unexpected result is apparently highly dependent upon the electrical properties of the dielectric material 36. Voltages ranging from 580 to 4000 volts have been found effective in producing a non-corona extinction of typical storage panels.

For example, using a dielectric layer 36 of cellophane a potential of as little as 580 volts has been found sufficient to bring about total panel extinction. When Tedlar, polyvinylfluoride, is utilized as the dielectric layer 36 extinction may be produced with potentials on the order of 1200 volts. A dielectric layer 36 composed of acetate requires approximately 2000 volts to bring about extinction of the panel while Saran and Mylar layers require even higher potentials.

A Tedlar, i.e. polyvinylfluoride, film is the preferred material for the dielectric layer 36. The electrical properties of polyvinylfluoride are: a dielectric constant of approximately 10, a volume resistivity varying from $7\times10^{14}$ ohm-cm. at 23° C. to $1.5\times10^{11}$ ohm-cm. at 100° C., and a dielectric strength of approximately 3.5 kilovatts per mil.

A polyvinylfluoride film with acrylic-epoxy adhesive bonding it to a zinc oxide field-effect semiconductor layer has an index of refraction sufficiently similar to that of the zinc oxide so that it renders the zinc oxide layer nearly transparent and allows the use of contrast enhancement schemes which would otherwise be unusable because of the light scattering properties of zinc oxide. For example, the above described arrangement allows the dying of the electroluminescent layer so as to absorb incident light while allowing the light from the electroluminescent layer to pass with little attenuation.

Variations in the thickness of the dielectric layer 36 may be utilized to vary the time constant and thus the time required for erasure. This variation also alters the required potential for panel extinction in accord with the well known relationships between capacitance, area, thickness, potential, and the time constant of the effective circuit.

The transparent conductive layer 38 may be NESA glass or may consist of thin layers of copper oxide, copper iodide, tin oxide, gold, and the like. However, somewhat more complex multi-layered structures for the transparent conductive layer 38 have been found to improve performance and to provide optical advantages which enhance the overall performance of the panels. One of the preferred structures for transparent conductive layer 38 when applied to a polyvinylfluoride layer 36 which is bonded to the zinc oxide field-effect semiconductive layer 34 by an adhesive such as rubber cement is described below. Over the polyvinylfluoride layer 36 is a layer of adhesive such as rubber cement bonding a thin layer of gold which is coated on both sides with an aluminum or chromium film to protect and give structural integrity to the gold layer. These layers are covered by a layer of Mylar coated with magnesium fluoride to act as an anti-reflection coating.

In the alternative, the polyvinylfluoride layer 36 may be coated with an electroconductive resin such as the water soluble cationic polymeric salt, polyvinylbenzyl trimethyl ammonium chloride, available from Dow Chemical Co. as Experimental Resin QX–2611.7. Such a resin may be plasticized by an addition of 10 to 50% ethylene glycol.

Figure 3:
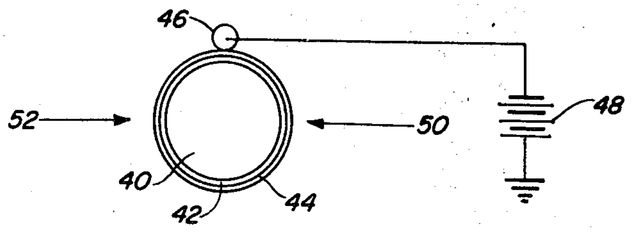
FIG. 3 is a cross-sectional representation of a solid state storage drum adapted for non-corona extinction.

The above described configurations are ideally suited for solid state storage devices in the flat panel form. While these configurations may be adapted to a solid state storage device having a drum configuration, a simpler embodiment shown in FIG. 3 is well suited for the drum configuration. Coated on drum 40 is a field-effect solid-state storage array 42 having a structure of the type illustrated in FIGS. 1 and 2 and operated in the same manner. Over the solid state storage device 42 is coated a dielectric layer 44, preferably polyvinylfluoride, although other dielectric materials may be employed. A freely rotatable electrically biased conductive roller 46 makes tangential contact with the drum and the dielectric layer 44. Potential means 48 supply the electrically conductive roller 46 with a suitable voltage on the order of 2000 v. to produce extinction of the image drum as it rotates under the roller electrode 46. Obviously other non-corona electrode configurations may be employed in lieu of the roller configuration of 46 shown. Assuming clockwise rotation for drum 40 produced by suitable well known drive means (not shown), image information may be entered on the image storage drum 42 at station 50, the same information may be viewed and a hard copy of it made, if desired, at station 52 and the information erased from the storage and display drum 42 as it passes under the biased conductive roller 46. As the drum continues to rotate it now presents the erased surface for the entry of new information at station 50. In addition to optical input to the solid state storage device of layer 42 it is possible to provide input to the device 42 by contact electrographic and impact printing means through the dielectric layer 44.

Thus, in operation, both of the embodiments of FIGS. 2 and 3 utilize the application of a suitable potential through a dielectric layer to the field effect control layer of a solid state image and storage device to bring about its non-corona extinction.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A solid state storage device having non-corona extinction capability comprising:
- a supporting substrate,
- a plurality of closely spaced electrodes supported adjacent one surface of said supporting substrate, alternate ones of said closely spaced electrodes being mutually electrically insulated from each other and adapted for connection to opposite sides of an energizing power supply,
- electroluminescent material overlying said plurality of electrodes,
- a layer of field-effect semiconductor material overlying said electroluminescent material, whereby the flow of current between adjacent ones of said plurality of electrodes when said electrodes are connected to said energizing power supply causes the illumination of adjacent electroluminescent material, and
- extinction means for extinguishing the illumination from said electroluminescent material, said extinction means including a transparent dielectric layer overlying said field-effect semiconductor layer, and conductor means in contact with said dielectric film, said conductor means being adapted for connection to a potential source, whereby application of potential of sufficient magnitude to said dielectric layer extinguishes the illumination produced by said flow of current between adjacent ones of said plurality of electrodes.

2. The solid state storage device of claim 1 wherein said conductor means comprises a transparent conductive layer in overlying contact with said transparent dielectric layer.

3. The solid state storage device of claim 1 wherein said conductor means comprises a conductive roller, said device further including means to cause relative movement of said transparent dielectric layer and said conductive roller.

4. The solid state storage device of claim 3 wherein said device has a cylindrical drum configuration and said conductive roller contacts the outer cylindrical surface thereof.

5. The solid state storage device of claim 1 further including a potential source connected to said conductor means.

6. The solid state storage device of claim 5 wherein said potential source applies voltages on the order of about 580 to 4000 volts to said transparent dielectric layer.

7. The solid state storage device of claim 1 wherein said transparent dielectric layer comprises polyvinylfluoride.

8. The solid state storage device of claim 2 wherein said transparent conductive layer comprises an electroconductive resin.

9. The solid state storage device of claim 2 wherein said transparent conductive layer comprises a thin layer of gold protected with an anti-reflective coating.

10. A method of extinguishing illumination from a field-effect semiconductor controlled solid state storage device comprising a supporting substrate, a plurality of closely spaced electrodes supported adjacent one surface of said supporting substrate, alternate ones of said closely spaced electrodes being mutually electrically insulated from each other and adapted for connection to opposite sides of an energizing power supply, electroluminescent material overlying said plurality of electrodes, and a layer of field-effect semiconductor material overlying said electroluminescent material, the flow of current between adjacent ones of said plurality of electrodes when said electrodes are connected to said energizing power supply causing the illumination of adjacent electroluminesceit material, said method comprising:

providing a transparent dielectric layer in overlying contact with the exposed surface of said field-effect semiconductor material,
placing a conductive material in contact with at least a portion of said transparent dielectric layer,
causing said device to emit an output image, and
applying a potential of sufficient magnitude to said conductive material to extinguish illumination comprising at least a portion of said output image from those portions of said electroluminescent material underlying said conductive material.

11. The method of claim 10 wherein the entire illumination comprising said output image is extinguished by application of the potential to said conductive material.

12. The method of claim 10 wherein only a portion of the illumination comprising said output image is extinguished by application of the potential to said conductive material.

13. A solid state storage device having non-corona extinction capabiilty comprising:

a supporting substrate,
a plurality of closely spaced electrodes supported adjacent one surface of said supporting substrate, alternate ones of said closely spaced electrodes being mutually electrically insulated from each other and adapted for connection to opposite sides of an energizing power supply, said electrodes being the only imaging electrodes associated with said storage device,
electroluminescent material overlying said plurality of electrodes,
a layer of field-effect semiconductor material overlying said electroluminescent material, whereby the flow of current between adjacent ones of said plurality of electrodes when said electrodes are connected to said energizing power supply causes the illumination of adjacent electroluminescent material, and
extinction means for extinguishing at least a portion of the illumination from said electroluminescent material, said extinction means comprising means for flowing moist air over the exposed surface of said field-effect semiconductor material.

14. The solid state storage device of claim 13 wherein said extinction means includes means to direct the flow of moist air to selected portions of said exposed field-effect semiconductor surface, whereby selective non-corona extinction of illumination generated by said device is achieved.

15. The solid state storage device of claim 13 further including means to expose darkened areas of said device to electromagnetic radiation, whereby the electroluminescent material underlying said exposed darkened areas is restored to an illumination-producing condition.

16. A method of extinguishing illumination from a field-effect semiconductor controlled solid state storage device comprising a supporting substrate, a plurality of closely spaced electrodes supported adjacent one surface of said supporting substrate, alternate ones of said closely spaced electrodes being mutually electrically insulated from each other and adapted for connection to opposite sides of an energizing power supply, electroluminescent material overlying said plurality of electrodes, and a layer of field-effect semiconductor material overlying said electroluminescent material, the flow of current between adjacent ones of said plurality of electrodes when said electrodes are connected to said electrodes are connected to said energizing power supply causing the illumination of adjacent electroluminescent material, said method comprising:

causing said device to emit an output image, and
directing a flow of moist air across the exposed surface of said field-effect semiconductor material to extinguish at least a portion of said output image.

17. The method of claim 16 wherein the entire output image is extinguished.

18. The method of claim 16 further including exposing some of the darkened portions of said device to electromagnetic radiation, whereby underlying electroluminescent material is re-illuminated and a second output image is obtained.

References Cited

UNITED STATES PATENTS

| | | | |
|---|---|---|---|
| 3,084,262 | 4/1963 | Tomlinson | 250—211 X |
| 3,213,317 | 10/1965 | Coghill | 250—211 X |
| 3,246,162 | 4/1966 | Chin | 340—173 X |
| 3,247,389 | 4/1966 | Kazan | 250—213 |
| 3,441,736 | 4/1969 | Kazan | 250—211 X |

TERRELL W. FEARS, Primary Examiner

U.S. Cl. X.R.

250—211